US006472029B1

United States Patent
Skszek

(10) Patent No.: US 6,472,029 B1
(45) Date of Patent: Oct. 29, 2002

(54) FABRICATION OF LAMINATE STRUCTURES USING DIRECT METAL DEPOSITION

(75) Inventor: Timothy W. Skszek, Saline, MI (US)

(73) Assignee: The P.O.M. Group, Auburn Hills, MI (US)

(*) Notice: Subject to any disclaimer, the term of this patent is extended or adjusted under 35 U.S.C. 154(b) by 0 days.

(21) Appl. No.: 09/670,670

(22) Filed: Sep. 27, 2000

Related U.S. Application Data

(63) Continuation-in-part of application No. 09/570,986, filed on May 15, 2000, which is a continuation-in-part of application No. 09/107,912, filed on Jun. 30, 1998, now Pat. No. 6,122,564.
(60) Provisional application No. 60/156,202, filed on Sep. 27, 1999.

(51) Int. Cl.$^7$ .............................. B05D 3/02; B05D 5/00; B05D 3/06; B05D 1/36
(52) U.S. Cl. ...................... 427/554; 427/596; 427/597; 427/133; 427/404; 700/166
(58) Field of Search ................................ 427/554, 596, 427/597, 133, 404; 219/121.85, 76, 12; 700/123, 166

(56) References Cited

U.S. PATENT DOCUMENTS

| | | | |
|---|---|---|---|
| 4,323,756 A | 4/1982 | Brown et al. ......... 219/121 LF |
| 4,724,299 A | 2/1988 | Hemmeke ................ 219/121 L |
| 4,777,002 A | * 10/1988 | Putz ............................ 264/226 |
| 4,966,225 A | * 10/1990 | Johnson et al. ............. 164/519 |
| 5,062,786 A | * 11/1991 | Arai ............................ 425/174 |
| 5,208,431 A | * 5/1993 | Uchiyama et al. ...... 219/121.65 |
| 5,837,960 A | 11/1998 | Lewis et al. ........... 219/121.63 |
| 5,875,830 A | * 3/1999 | Singer et al. .................. 164/19 |
| 6,122,564 A | * 9/2000 | Koch et al. .................. 700/123 |

* cited by examiner

Primary Examiner—Michael Barr
(74) Attorney, Agent, or Firm—Gifford, Krass, Groh, Sprinkle, Anderson & Citkowski, PC

(57) ABSTRACT

A laminate material composite structure is fabricated using a laser-based direct-metal deposition process to provide unique physical and mechanical properties. The relative difference in physical properties such as thermal conductivity between dissimilar pure metals or metal alloys provides the ability to deposit highly conductive materials having a low level of porosity using the DMD laser-based process. The proximity of a pure metal or metal alloy which has relatively high mechanical properties, compared to that of thermally conductive material, provides the structural strength, hardness and wear resistance required of mold materials. The combination of physical and mechanical properties associated with the laminate material composite structure provide thermal management benefits which result in a reduction in molding process cycle times and improved part quality.

13 Claims, 2 Drawing Sheets

FABRICATION OF LAMINATE STRUCTURES USING DIRECT METAL DEPOSITION

REFERENCE TO RELATED APPLICATION

This application is a continuation-in-part of U.S. patent application Ser. No. 09/570,986, filed May 15, 2000, which is a continuation-in-part of U.S. patent application Ser. No. 09/107,912, filed Jun. 30, 1998, now U.S. Pat. No. 6,122,564, and also claims priority from U.S. provisional application Ser. No. 60/156,202, filed Sep. 27, 1999, the entire contents of all of which are incorporated herein by reference.

FIELD OF THE INVENTION

This invention relates generally to additive manufacturing processes and, in particular, to the formation of laminate structures using laser-assisted direct metal deposition processes

BACKGROUND OF THE INVENTION

Fabrication of three-dimensional metallic components via layer-by-layer laser cladding was first reported in 1978 by Breinan and Kear. In 1982, U.S. Pat. No. 4,323,756 issued to Brown et al., describing a method for the production of bulk rapidly solidified metallic articles of near-net shape, finding particular utility in the fabrication of certain gas turbine engine components including discs and knife-edge air seals. According to the disclosure, multiple thin layers of feedstock are deposited using an energy beam to fuse each layer onto a substrate. The energy source employed may be a laser or an electron beam. The feedstock employed in the practice of the invention may be either a wire or powder material, and this feedstock is applied to the substrate in such a fashion that it passes through the laser beam and fuses to the melted portion of the substrate.

Different technologies have since evolved to improve such processes. U.S. Pat. No. 4,724,299 is directed to a laser spray nozzle assembly including a nozzle body with a housing that forms an annular passage. The housing has an opening coaxial with a passageway, permitting a laser beam to pass therethrough. A cladding powder supply system is operably associated with the passage for supplying cladding powder thereto so that the powder exits the opening coaxial with the beam.

Various groups are now working world-wide on different types of layered manufacturing techniques for fabrication of near-net-shape metallic components. In particular, nozzles of the type described above have been integrated with multi-axis, commercially available CNC machines for the fabrication of 3-dimensional components. U.S. Pat. No. 5,837,960 resides in a method and apparatus for forming articles from materials in particulate form. The materials are melted by a laser beam and deposited at points along a tool path to form an article of the desired shape and dimensions. Preferably the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

As a material for injection molds, thermally conductive materials such as copper and copper alloys have demonstrated significant performance improvements compared to the traditional use of tool steel alloys. The productivity improvement is associated with the increase in heat transfer due to the enhanced thermal conductivity of such materials.

The ability to fabricate articles comprised of high-density metallic materials using direct metal deposition becomes increasingly difficult as the thermal conductivity of the deposited material increases. Presently, laser-based deposition systems utilize either high-power $CO_2$ or Nd-YAG lasers. As such, existing application of the technology do not include the fabrication of articles comprised of thermally conductive materials such as pure copper, or copper alloys. Instead, existing applications are relegated to the fabrication of three-dimensional articles comprised of iron- or cobalt-based alloys.

At the same time, the commercial applications of thermally conductive materials such as pure copper and related alloys are limited due to inferior material properties such as yield strength, hardness and abrasion resistance required for tools dies and molds. Moreover, the mechanical properties of copper and copper-based alloys are reduced significantly when they are exposed to elevated temperatures, inherent to the material being processed.

The use of copper and copper alloys as mold materials has accordingly been limited to low-temperature plastic injection molding applications associated with nonfilled polymers. Pure copper or copper-based alloys are typically not used as mold materials in metal die-cast or injection molding processes which include reinforced or glass-filled polymers, due to their relatively poor mechanical and physical properties.

SUMMARY OF THE INVENTION

This invention overcomes shortcomings in the prior art through the use of direct-metal deposition (DMD) to fabricate composite material structures which provide a combination of desirable physical and mechanical properties. In particular, use of the invention facilitates the production of high-strength, abrasion-resistant laminate structures which also exhibit a high degree of thermal conductivity.

In the preferred embodiment, the invention uses DMD to deposit alternate layers or rows of a thermally conductive material, such as copper or copper alloys, and a high strength, abrasion resistant thermal barrier material, such as tool steel. The resulting composite material structure has mechanical properties (i.e., yield strength, hardness and abrasion resistance) which exceed that of pure copper or copper-based alloys required for mold materials, thereby enhancing productivity while improving part quality in these and other applications.

DETAILED DESCRIPTION OF THE INVENTION

Figure 1:
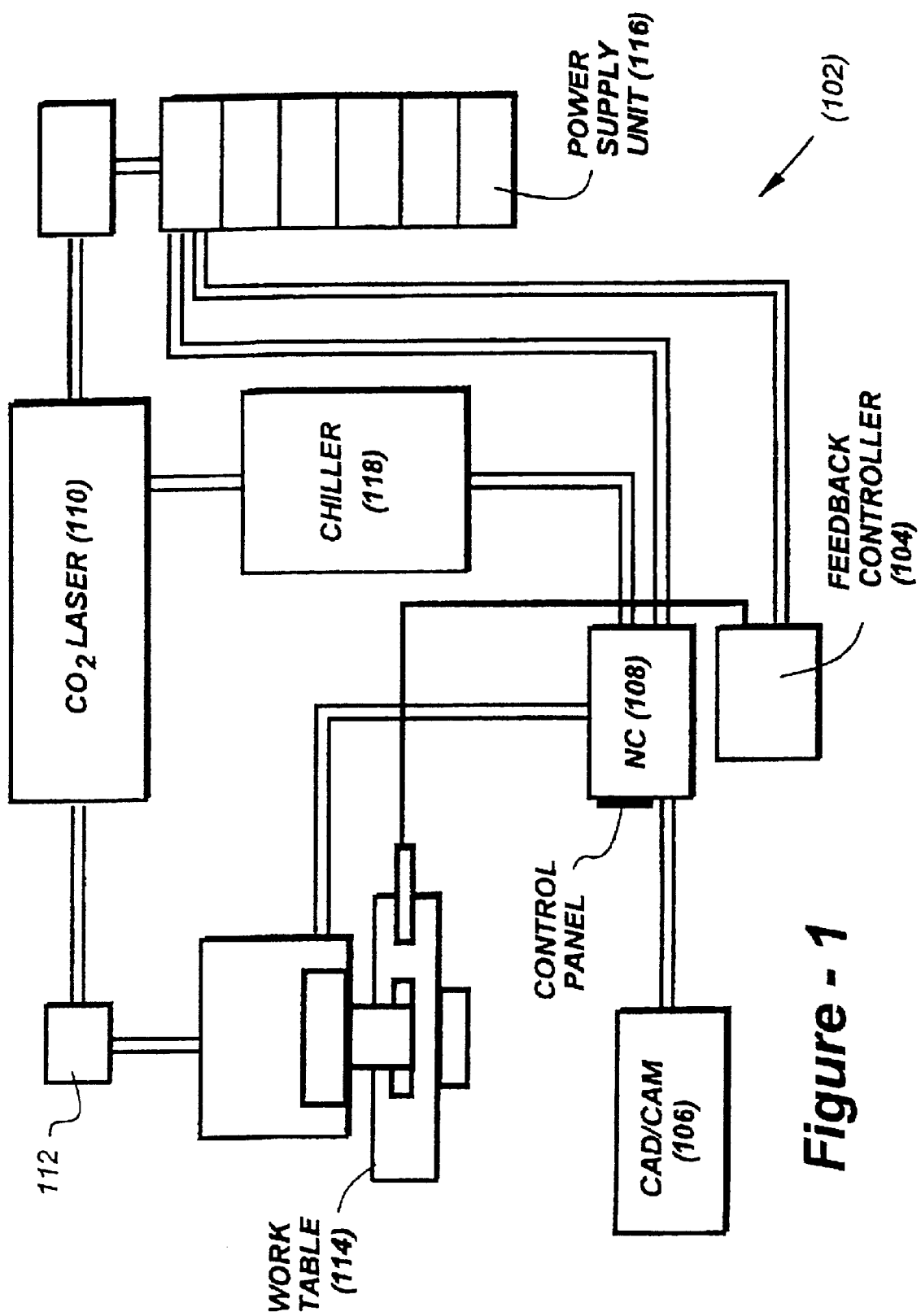
FIG. 1 is a block diagram depicting equipment associated with a DMD process applicable to the invention.

FIG. 1 illustrates a laser-aided, computer controlled direct material deposition (DMD) system in schematic form. The system 10 applies layers of material 20 on a substrate 30 to fabricate an object or cladding. As discussed above, the system is preferably equipped with feedback monitoring to control of the dimensions and overall geometry of the fabricated article. The geometry of the article is provided by a computer-aided design (CAD) system.

The deposition tool path is generated by a computer-aided manufacturing (CAM) system for CNC machining with post-processing software for deposition, instead of software for removal as in conventional CNC machining. CAM software interfaces with a feedback controller 104. These details of the laser-aided, computer controlled direct material deposition system can be found in U.S. Pat. No. 6,122,564, which is fully incorporated herein by reference, and are not all explicitly shown in FIG. 1.

The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 80 of the direct material deposition system typically cooperates directly with the numerical controller 90, which, itself, controls all functions of the direct material deposition system, including laser power.

The laser source 110 of the DMD system is mounted above the substrate 30 and a layer of material 20 is deposited according to the description of the object. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

A numerical controller 108 controls all operating components of the DMD system of FIG. 1, including the operating conditions of the laser, receiving direction from the CAD/CAM system 106 for building the part or product. The numerical controller 108 also receives feedback control signals from the feedback controller 104 to adjust laser power output, and further controls the relative position of the substrate and laser spray nozzle. The CAD/CAM system 106 is equipped with software which enables it to generate a path across the substrate for material deposition.

The laser is used to locally heat a spot on a substrate, forming a melt pool into which powder is fed to create a deposit having a physical dimension such as height. As described in commonly assigned U.S. Pat. No. 6,122,564, the extent of the physical dimension is controlled using an optical feedback loop. Optical detection means coupled to an optoelectric sensor are used to monitor the deposit, and a feedback controller is operative to adjust the laser in accordance with the electrical signal, thereby controlling the rate of material deposition. In the preferred embodiment, the physical dimension is the height of the deposit, and the system further includes an interface to a computer-aided design (CAD) system including a description of an article to be fabricated, enabling the feedback controller to compare the physical dimension of the deposit to the description and adjust the energy of the laser in accordance therewith.

In terms of specific apparatus, the optical detection means preferably includes an apertured mask through which light from the deposit passes to reach the optoelectric sensor, and the feedback controller includes circuitry for adjusting the laser in accordance with the presence or absence of the light from the deposit. This allows the system to optically monitor the physical dimension of the deposit, and control the physical dimension in accordance with the description of the article to be fabricated. The deposition head, preferably equipped with flying optics, is advanced to different localized region of the substrate until the fabrication of the article is completed.

Laser-Based Processing of Thermally Conductive Materials

Figure 2:
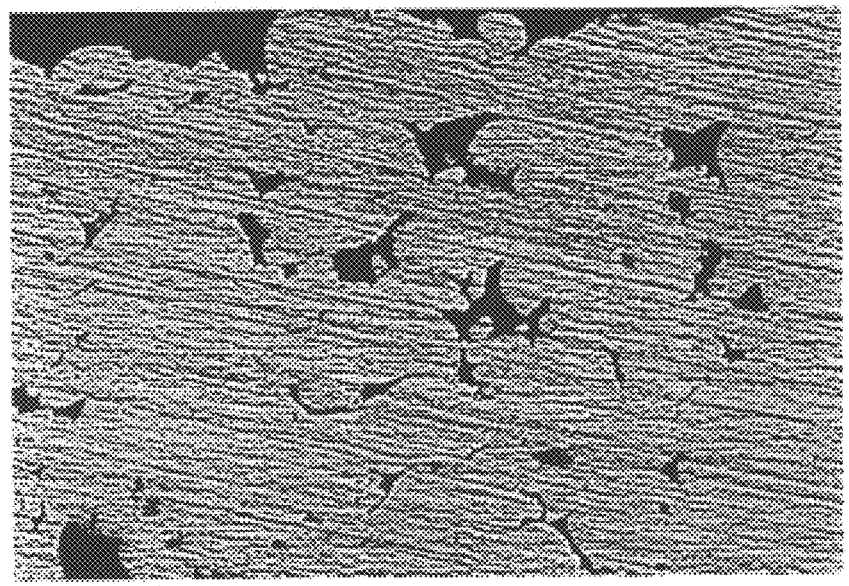
FIG. 2 illustrates how irregularly shaped voids and porosity may result by depositing 99% pure copper using a DMD process.

The ability to fabricate a composite article, including a thermally conductive metal or metal alloy, using a laser-based process such as DMD requires the capability to establish and maintain a molten pool associated with the metal alloy being processed. However, the heat transfer characteristics inherent in thermally conductive materials preclude their use as a mold material, due to the inability to sustain melt pool characteristics during DMD processing. This results in incomplete melting, porosity and associated reduction in the required mechanical and physical properties. FIG. 2 illustrates one result of depositing 99% pure copper using a DMD process. Note the irregularly shaped voids and porosity of the resulting structure.

Processing of thermally conductive materials using a laser-based deposition process is feasible, however, if the thermal conductive material is deposited adjacent to an alloy which has relatively lower thermal conductivity properties. The result is, in essence, a laminate structure comprised of materials which impose unidirectional heat flow, limiting the rate at which heat is dissipated. This, in turn, provides the ability to establish and maintain a melt pool enabling the deposition of a high quality, highly conductive material.

Figure 3:
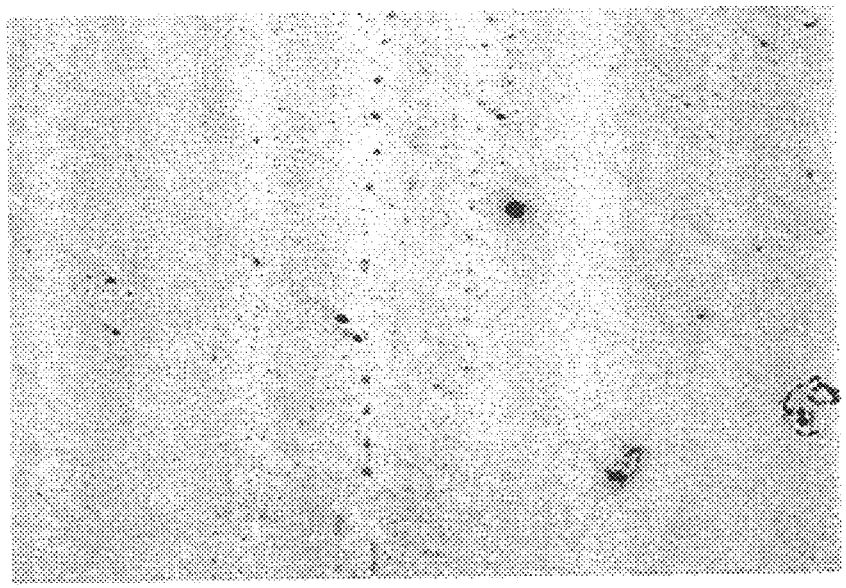
FIG. 3 is a cross section of a laminate structure fabricated according to the invention using alternate layers of 99% pure copper deposited within the confines of a tool steel matrix.

In the preferred embodiment, this invention uses DMD to deposit alternate layers or rows of a thermally conductive material, such as copper or copper alloys, and a high strength, abrasion resistant thermal barrier material, such as tool steel. The resulting composite material structure has mechanical properties (i.e., yield strength, hardness and abrasion resistance) which exceed that of pure copper or copper-based alloys required for mold materials, thereby enhancing productivity while improving part quality in these and other applications. The table below lists important parameters associated with an exemplary application of DMD as applied to a laminate fabrication process, and FIG. 3 is a cross section of a laminate structure fabricated according to the invention using alternate layers of 99% pure copper deposited within the confines of a tool steel matrix. Note the lack of irregularly shaped voids and porosity.

TABLE I

Laminate Fabrication Process Parameters

| | |
|---|---|
| Laser | 2.4 kw continuous wave $CO_2$ laser |
| Beam Diameter | 0.8 mm |
| Laminate Ratio | 1.5:1 |
| Copper Deposition | 1.0 mm wide |
| 420 SS Deposition | 1.5 mm wide |
| Step-Over Distance | 0.5 mm |
| Laser Power Cu | 2000 watts |
| Laser Power 420SS | 1200 watts |
| CNC Velocity | 400 mm/min |

In some cases, the composite laminate structure may use more than two alternating layers. For example, a structure according to the invention may be comprised of three materials, including a conductive material, preferably copper, a bond coat material, preferably a nickel alloy, and a high strength mold material, preferably tool steel. The bond coat material provides an interface between the conductive material and the high strength material, providing a metallurgical bond between the dissimilar materials, thereby avoiding delamination, potential crack formation and crack propagation during functional use.

The fabrication of a thermally conductive composite material comprised of two or more pure metals or metal alloys provides the capability to transfer heat to and/or from a mold surface at a rate much higher than that of conventional tool steel alloys, thus maintaining the required structural and abrasion resistance associated with the molding process. Fabrication of the composite laminate structure, which preferably has a laminate spacing which ranges between 2:1 to 4:1, provides the capability to fabricate the highly conductive, high strength and abrasion resistant material required for use as a mold material for plastic and metal molding processes.

The selection of a mold material is typically associated with the desired mechanical and physical properties such as surface quality and application requirements such as molding pressure and material to be processed. The mold surface temperature is generally considered to be a function physical properties associated with the mold material (thermal conductivity) and the temperature difference between the mold surface and the heat transfer media, be it water or oil.

Traditional means to control the rate of heat transfer and resulting die surface temperature has involved variation in the flow rate, area and pressure associated with heat transfer media through the cooling/heating line, as well as the location of the cooling/heating line relative to the molding surface. Molding process cycle times are often varied to obtain the desired mold surface temperatures, resulting in a loss of productivity. Location of a cooling/heating line too close to the mold surface may result in a reduction in die life. The cause is generally thermal fatigue due to the relatively high thermal gradient between the mold surface and heat transfer media or lack of structural strength imposed by the presence of the heating/cooling line.

The rate of heat transfer, die surface temperature, process cycle time and resulting part quality can be engineered according to this invention by varying the design of the composite material laminate structure. For example, by varying the layer thickness of a relatively low thermally conductive material such as tool steel, the rate of heat transfer, die surface temperature, and resulting molded part quality may be managed in a manner specific to the molded part geometry. At the same time, the molding surface adjacent to the composite laminate material may be heated or cooled by flowing a heat transfer fluid through the laminate composite, an electrically heated device, or by conduction through contact and fitted surfaces of adjacent mold components.

The size and shape of the heat transfer channel integral to the laminate structure may be formed by conventional drilling, which results in a round shaped cross-section. Alternatively, the channels may be formed through the deposition of a sacrificial material, resulting in a "conformal cooling channel," as described in co-pending U.S. patent application Ser. Nos. 09/526,631 and 09/570,986, the contents of both of which are incorporated herein by reference. Rectangular or elliptical shaped heat transfer channels provide an increased heat transfer efficiency by increasing the surface/volume ratio. Regardless of the technique used for heat transfer channel formation, the thermally conductive layers of the laminate structure may be oriented perpendicular or transverse to the direction of cooling, thereby significantly increasing thermal management efficiency.

I claim:

1. A method of fabricating a laminate structure, comprising the steps of:
   a) depositing a layer of a thermal barrier material onto a substrate using a laser-assisted direct metal deposition process,
   b) depositing a layer of a thermally conductive material onto the layer of the thermal barrier material, also using a laser-assisted direct metal deposition process; and
   c) repeating steps a) and b), in sequence, to create a laminate structure having alternating layers of the thermal barrier and thermally conductive materials.

2. The method of claim 1, wherein the thermal barrier material is a steel.

3. The method of claim 2, wherein the steel is a tool steel.

4. The method of claim 1, wherein the thermally conductive material contains copper.

5. The method of claim 1, wherein the thermally conductive material is elemental copper.

6. The method of claim 1, wherein the ratio of the thermal barrier material to the thermally conductive material is from 2:1 to 4:1.

7. The method of claim 1, further including the step of depositing a bond coat material layer between the thermal barrier and thermally conductive material layers.

8. The method of claim 7, wherein the bond coat material is a nickel alloy.

9. The method of claim 1, wherein the laminate structure forms part of a die or mold.

10. The method of claim 9, further including the step of forming one or more cooling channels though the die or mold.

11. The method of claim 10, wherein the cooling channels are formed by drilling.

12. The method of claim 10, wherein the cooling channels are formed by removing sacrificial material deposited using the same process used to fabricate the laminate structure.

13. The method of claim 10, wherein the cooling channels are transversely oriented with respect to the alternating layers of the laminate structure.

* * * * *